G. E. CALLAWAY.
AUTOMATIC LINE SPACING DEVICE FOR TYPE WRITERS.
APPLICATION FILED MAR. 17, 1917.
1,233,976.
Patented July 17, 1917.
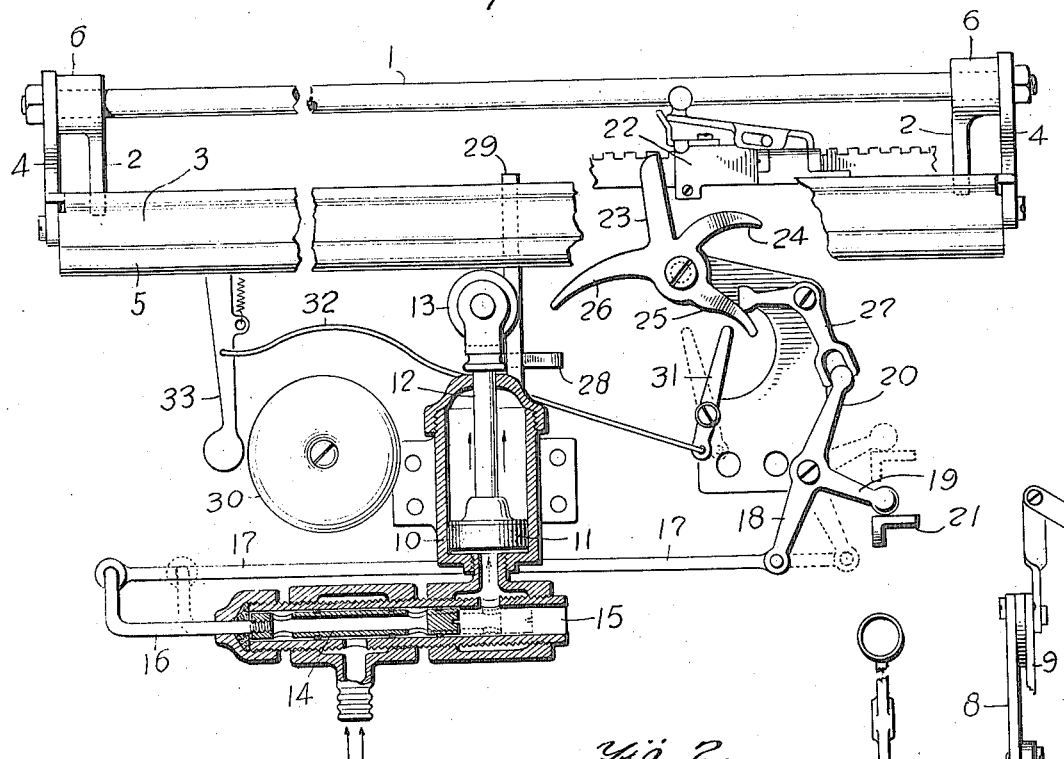
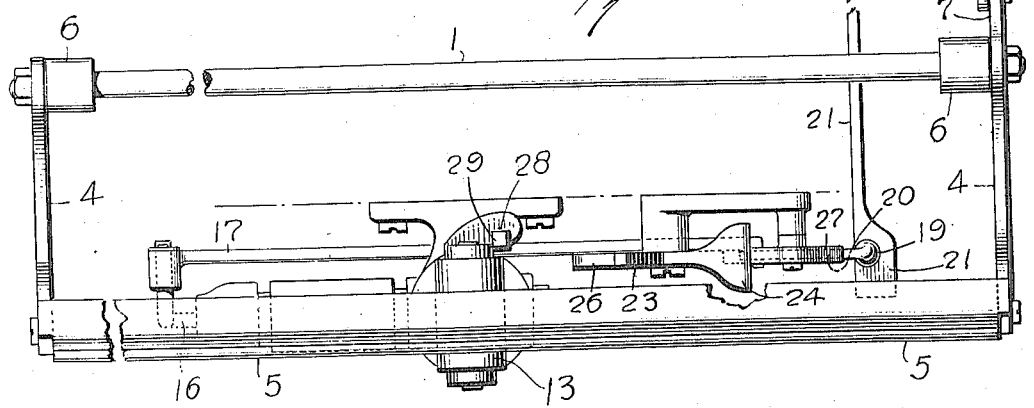
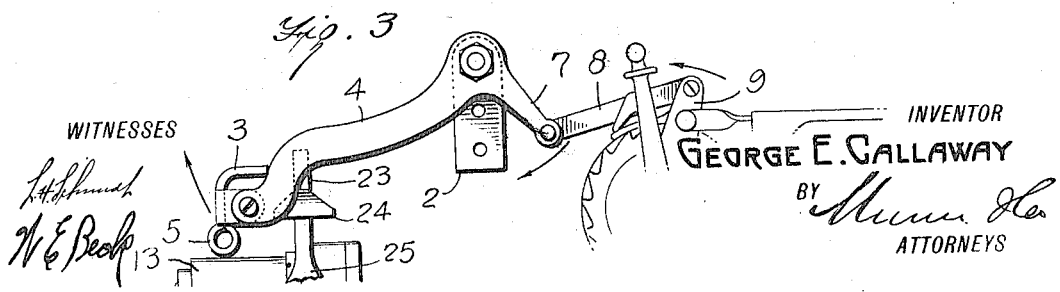
WITNESSES
INVENTOR
George E. Callaway
BY
ATTORNEYS

UNITED STATES PATENT OFFICE.

GEORGE ENOCH CALLAWAY, OF BIENVILLE, LOUISIANA.

AUTOMATIC LINE-SPACING DEVICE FOR TYPE-WRITERS.

1,233,976.     Specification of Letters Patent.     Patented July 17, 1917.

Application filed March 17, 1917. Serial No. 155,457.

*To all whom it may concern:*

Be it known that I, GEORGE ENOCH CALLAWAY, a citizen of the United States, and a resident of Bienville, in the parish of Bienville and State of Louisiana, have invented an Improvement in Automatic Line-Spacing Devices for Type-Writers, of which the following is a specification.

My invention is an improvement in automatic line spacing devices for typewriters, and has for its object to provide means operated by the carriage of the typewriter when it nears the limit of its movement in writing direction, for automatically setting up a new line or lines.

In the drawings:

Figure 1 is a rear view of the device with parts in section.

Fig. 2 is a top plan view.

Fig. 3 is a partial end view.

The present embodiment of the invention is designed to coöperate with the carriage returning mechanism shown in my Patent No. 1,208,477, granted December 12, 1916, and the invention comprises a frame consisting of a shaft or rod 1 having brackets 2 for connection with the carriage of the typewriter, and a plate 3 which is connected to the shaft by end bars 4.

This plate 3 is provided with a tubular portion 5 at its lower edge, and the shaft 1 is journaled in bearings 6 on the brackets 2, in such manner that the entire frame constituted by the elements 1, 3, 4 and 5 may swing on the brackets. One of the end bars 4 is provided with an extension 7, which is connected by a link 8 with the setting up mechanism of the typewriter indicated generally at 9 for moving the platen roll to advance the paper a line or lines, as may be desired. The connection is such that when the frame 1—3—4 is swung upwardly at its rear end the line spacing mechanism will be operated to advance the paper.

In my prior patent above-mentioned, the carriage is returned by fluid pressure controlled mechanism, and the present device is also operated by fluid pressure controlled mechanism. The said mechanism comprises a cylinder 10, in which is arranged a piston 11 having a rod 12 extending through the upper end of the cylinder, and the rod carries a roller 13, which is adapted to engage the tubular portion 5 of the frame to lift the same when the piston is moved upwardly. Fluid under pressure is supplied to the cylinder by means of a valve 14, which is mounted to reciprocate in a valve casing 15 arranged below the cylinder and connected therewith, as shown.

This valve is movable in the casing, having connected therewith a stem 16, which is connected by a link 17 with a three-armed rock lever mounted on the frame of the typewriter. This lever has arms 18, 19 and 20, the first-named being connected to the link 17. When the lever 18—19—20 is swung into the position indicated by dotted lines in Fig. 1, the cylinder is connected with the source of supply for the fluid under pressure, while when the parts are in the full line position of Fig. 1 the cylinder is connected with the atmosphere.

This lever may be operated by a key indicated at 21, which is mounted with the remaining keys of the typewriter in such position that it may be easily manipulated by the operator, and when the button end of the key is depressed the lever 18—19—20 will be moved in a direction to cause the valve 14 to connect the cylinder with its source of supply.

When the carriage of the typewriter nears the end of its movement to the left of the operator, one of the stops 22 at the right of the carriage, that is at the right of the operator, will engage one of the arms 23 of a four-armed lever, and will swing the said lever on its pivotal connection. This lever, as before stated, has four arms, 23, 24, 25, and 26, and one of the arms 25 of the lever will engage one of the arms of a bell crank or elbow lever 27 also pivoted on the frame of the typewriter. The other arm of the lever is forked, as shown, and engages one of the arms 20 of the three-armed lever 18—19—20 before-mentioned. When the lever 23—24—25—26 is swung by the stop 22, the bell crank 27 will be swung, and will swing the lever 18—19—20 in a direction to cause the valve 14 to connect the source of fluid under pressure with the cylinder, to cause the roller to swing the frame, to set up the platen roll.

When the piston 11 moves upward to set up the platen roll, a laterally extending lug 28 on the piston rod will engage the arm 26 of the lever 23—24—25—26, and will swing the said lever in a direction to cause the arm 24 of the said lever to engage the bell crank 27, to return the lever 18—19—20 and the valve 14 to the full line or normal position of Fig. 1. This lug 28 engages a guide 29 extending upwardly from the cylinder, and in addition to returning the valve to normal position, the lever 23—24—25—26 will operate the bell of the typewriter indicated at 30. The arm 25 of the lever 23—24—25—26 engages the upper end of a lever 31 pivoted on the typewriter frame, and the said lever 31 is connected by a link 32 with the hammer 33 of the bell.

The operation of the device is as follows:

When the carriage nears the end of its movement to the left of the operator, the stop 22 will engage the arm 23 of the lever 23—24—25—26, and will swing the said lever to cause the same to move the bell crank 27 and the lever 18—19—20 in a direction to cause the valve 14 to connect the cylinder 10 with its source of supply. The piston 11 will be moved upward and the line spacing mechanism will be operated. A moment later the lug 28 will engage the arm 26 of the lever 23—24—25—26, and will swing the same in a direction to cause the said lever to return the valve 14 to the position of Fig. 1, connecting the cylinder 10 with the atmosphere, and returning the piston to normal position. The arm 25 of the lever 23—24—25—26 will engage the lever 31 and will sound the bell.

When it is desired to set up the paper manually, the key 21 is operated. Fluid under pressure may be supplied to the cylinder in the same manner as it is supplied to the operating cylinder in my prior patent, that is by the cushioning mechanism for the carriage.

I claim:

1. An automatic line spacing device for typewriters, comprising a substantially rectangular frame pivoted to the typewriter to swing vertically at its rear end and connected with the set works of the typewriter and operating the same when the frame is lifted at its rear end, a cylinder connected with the typewriter below the rear of the frame and having a piston, said piston carrying a roller for engaging beneath the frame to lift the same when the piston moves upwardly, a valve for alternately connecting the cylinder with a source of fluid under pressure and with the atmosphere, means controlled by the movement of the typewriter carriage for operating the valve to connect the cylinder with the source of supply, and means operated by the piston for operating the valve to connect the cylinder with the atmosphere, said first-named means comprising a lever pivoted to the typewriter frame and having one end connected with the valve for moving the same when the lever is swung, a rocker having an arm for engaging the lever to swing the same, and an arm for engagement by a stop of the typewriter carriage, and an arm for engagement by the piston as it moves upwardly to return the parts to normal position, and having another arm, and a lever connected with the bell hammer for engagement by the said last-named arm to ring the bell.

2. An automatic line spacing device for typewriters, comprising a substantially rectangular frame pivoted to the typewriter to swing vertically at its rear end and connected with the set works of the typewriter and operating the same when the frame is lifted at its rear end, a cylinder connected with the typewriter below the rear of the frame and having a piston, said piston carrying a roller for engaging beneath the frame to lift the same when the piston moves upwardly, a valve for alternately connecting the cylinder with a source of fluid under pressure and with the atmosphere, means controlled by the movement of the typewriter carriage for operating the valve to connect the cylinder with the source of supply, and means operated by the piston for operating the valve to connect the cylinder with the atmosphere, and means for ringing the bell of the typewriter, said means being controlled by the means for operating the valve.

3. An automatic line spacing device for typewriters, comprising a substantially rectangular frame pivoted to the typewriter to swing vertically at its rear end and connected with the set works of the typewriter and operating the same when the frame is lifted at its rear end, a cylinder connected with the typewriter below the rear of the frame and having a piston, said piston carrying a roller for engaging beneath the frame to lift the same when the piston moves upwardly, a valve for alternately connecting the cylinder with a source of fluid under pressure and with the atmosphere, means controlled by the movement of the typewriter carriage for operating the valve to connect the cylinder with the source of supply, and means operated by the piston for operating the valve to connect the cylinder with the atmosphere.

GEORGE ENOCH CALLAWAY.

Witnesses:
C. R. CARAWAY,
SMITH PRICE.